(12) United States Patent
Ichihara (10) Patent No.: US 12,548,593 B2
(45) Date of Patent: Feb. 10, 2026

(54) MAGNETIC DISK DEVICE AND METHOD FOR ADJUSTING HEAD FLYING HEIGHT IN MAGNETIC DISK DEVICE

(71) Applicants: Kabushiki Kaisha Toshiba, Tokyo (JP); Toshiba Electronic Devices & Storage Corporation, Tokyo (JP)

(72) Inventor: Kazuhito Ichihara, Tokyo (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/955,139

(22) Filed: Nov. 21, 2024

(65) Prior Publication Data
US 2025/0316288 A1 Oct. 9, 2025

(30) Foreign Application Priority Data
Apr. 8, 2024 (JP) .................... 2024-062175

(51) Int. Cl.
*G11B 5/60* (2006.01)
(52) U.S. Cl.
CPC .................... *G11B 5/607* (2013.01)
(58) Field of Classification Search
CPC ..... G11B 5/00; G11B 5/54; G11B 2005/0021; G11B 36/27; G11B 5/09
USPC .......................................... 360/75
See application file for complete search history.

(56) References Cited

U.S. PATENT DOCUMENTS

| | | | |
|---|---|---|---|
| 7,558,015 B2 | 7/2009 | Schreck et al. | |
| 7,808,740 B2 | 10/2010 | Tanabe | |
| 8,139,307 B2 | 3/2012 | Kim et al. | |
| 8,665,546 B1 * | 3/2014 | Zhao | G11B 5/607 360/55 |
| 8,970,983 B1 * | 3/2015 | Watanabe | G11B 17/32 360/75 |
| 10,410,662 B1 | 9/2019 | Liu et al. | |
| 2006/0044669 A1 | 3/2006 | Shimizu et al. | |
| 2008/0043355 A1 | 2/2008 | Ota | |
| 2010/0027154 A1 | 2/2010 | Sonoda | |
| 2010/0238585 A1 | 9/2010 | Kang | |

FOREIGN PATENT DOCUMENTS

| | | |
|---|---|---|
| JP | 2003-007017 A | 1/2003 |
| JP | 2005-346792 A | 12/2005 |
| JP | 2006-073075 A | 3/2006 |

(Continued)

OTHER PUBLICATIONS

Office Action issued in Japanese Patent Application No. 2024-062175 dated Apr. 15, 2025 in 5 pages.

(Continued)

*Primary Examiner* — Nabil Z Hindi
(74) *Attorney, Agent, or Firm* — Knobbe, Martens, Olson & Bear, LLP (57) ABSTRACT

According to an embodiment, the method for adjusting a head flying height in a magnetic disk device including a disk, a head that writes or reads data along tracks of the disk, and a heater provided near the head includes: determining a threshold of the head flying height; calculating a statistic from the chronological data of the head flying height; and adjusting the head flying height if the statistic exceeds the threshold.

20 Claims, 5 Drawing Sheets

(56) References Cited

FOREIGN PATENT DOCUMENTS

| JP | 2007-310937 A | 11/2007 |
|----|---------------|---------|
| JP | 2008-047241 A | 2/2008  |
| JP | 2010-033670 A | 2/2010  |
| JP | 2010/218680 A | 9/2010  |

OTHER PUBLICATIONS

Office Action issued in Japanese Patent Application No. 2024-062175 dated Jul. 8, 2025 in 12 pages.

* cited by examiner

MAGNETIC DISK DEVICE AND METHOD FOR ADJUSTING HEAD FLYING HEIGHT IN MAGNETIC DISK DEVICE

CROSS-REFERENCE TO RELATED APPLICATION

This application is based upon and claims the benefit of priority from Japanese Patent Application No. 2024-062175, filed Apr. 8, 2024, the entire contents of which are incorporated herein by reference.

FIELD

An embodiment of the present invention relates generally to a method for adjusting a head flying height in a magnetic disk device.

BACKGROUND

In magnetic disk devices, a narrow interval between the magnetic disk and the head is desirable to improve the recording density. On the other hand, when the magnetic disk is brought into contact with the magnetic head, the magnetic head is destroyed, and the life of the magnetic disk device will have been shortened.

DETAILED DESCRIPTION

Hereinafter, embodiments of the present invention will be described with reference to the drawings.

According to an embodiment, there is provided magnetic disk device comprising a disk, heads that write or read data to or from tracks of the disk, a heater provided near each of the heads, a head amplifier connected to the heads and the heater, exchanging signals with the heads and supplying power to the heater, a controller connected to the head amplifier that measures a head flying height, determines a threshold of the head flying height, and calculates a statistic for evaluating a variation in chronological data of the head flying height; wherein the head amplifier adjusts the head flying height if the statistic exceeds the threshold.

According to an embodiment, there is provided a method for adjusting a head flying height in a magnetic disk device including a disk, a head that writes or reads data along tracks of the disk, and a heater provided near the head, the method including: determining a threshold of the head flying height; calculating a statistic from the chronological data of the head flying height; and adjusting the head flying height if the statistic exceeds the threshold.

Note that the drawings are schematic or conceptual, and relationships between a thickness and a width of each portion, a ratio of sizes between portions, or the like are not necessarily the same as actual ones. In addition, even in a case where the same portion is illustrated, dimensions and ratios may be illustrated differently from each other depending on the drawings.

Note that, in the present specification and the drawings, the same elements as those described previously with respect to the previous drawings are denoted by the same reference numerals, and detailed description thereof is omitted as appropriate.

First Embodiment

Figure 1:
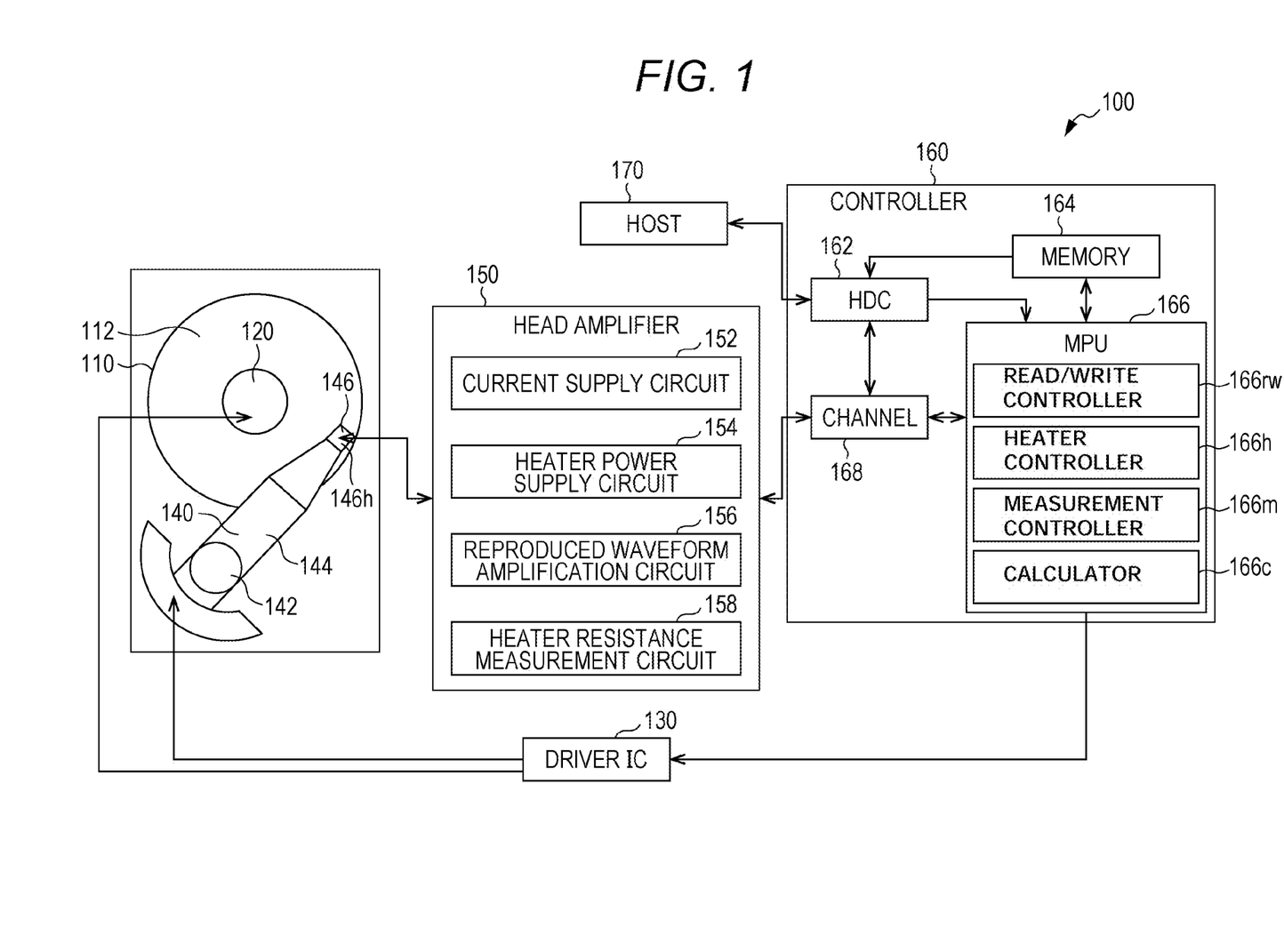
FIG. 1 is a block diagram illustrating a magnetic disk device according to a first embodiment.

FIG. 1 is a block diagram illustrating a magnetic disk device 100 according to the embodiment.

The magnetic disk device 100 includes a disk 110, a spindle motor 120, a driver IC 130, a head assembly 140, a head amplifier 150, a controller 160, and a host computer (host) 170.

The controller 160 controls operations of the spindle motor 120 and the head assembly 140 via the driver IC 130. In addition, the head assembly 140 and the controller 160 are connected via the head amplifier 150.

The disk 110 includes, for example, a plurality of magnetic disks, and each disk is rotatably attached. A rotation speed of the disk 110 is variable depending on a size or the like of the disk 110. The disk 110 includes a storage region 112, and data obtained by measuring a head flying height (FH) is recorded in the storage region 112.

The spindle motor 120 is connected to the disk 110 and drives rotation of the disk 110. A structure of the spindle motor 120 may vary depending on a structure of the disk 110, and for example, the spindle motor 120 may be an electromagnetic motor. The spindle motor 120 is driven by the driver IC 130.

The head assembly 140 includes an actuator 142, an arm 144, and a head 146.

The actuator 142 includes, for example, a voice coil motor (VCM). The actuator 142 can drive the arm 144 to position the head 146 at a predetermined position on the disk 110. The actuator 142 can position the head 146 in a radial direction of the disk 110 and position tracks for performing reading or writing.

The driver IC 130 is connected to the actuator 142 and controls an operation of the actuator 142. For example, motion of a motor included in the actuator 142 is controlled by controlling the amount of current flowing to a coil.

The head 146 includes a read head and a write head, the read head reads data from a surface of the disk 110, and the write head writes data on the surface of the disk 110. In addition, a heater 146*h* is provided in the vicinity of the head 146. The heater 146*h* can adjust, by an electrical signal flowing to the heater 146*h*, the FH which is an interval between the disk 110 and the head 146. For example, by increasing a value of a current flowing in the heater 146*h*, the heater 146*h* is heated and expands, thereby bringing the head 146 closer to the disk and making a decrease in the FH possible. The magnetic disk device 100 includes, for example, a plurality of arms 144, and may include a plurality of heads 146 accordingly. In addition, each head 146 may have a plurality of heaters 146*h*.

Information is recorded by controlling a magnetic field on the surface of the disk 110 with a current flowing in the head 146 and controlling a magnetization state of a magnetic body of the disk 110. Since the description of a configuration in which data is read and written from and to the surface of the disk 110 is not different from that of a general magnetic disk device, the details thereof will be omitted.

The head amplifier 150 includes a current supply circuit 152, a heater power supply circuit 154, a reproduced waveform amplification circuit 156, and a heater resistance measurement circuit 158.

The current supply circuit 152 supplies a current to the head 146 to generate a magnetic field on the surface of the disk 110, thereby writing information. The amount and a direction of the current flowing to the head 146 are controlled by a command from the controller 160.

The heater power supply circuit 154 supplies an electrical signal to the heater 146*h* and controls the operation of the heater 146*h* to adjust the FH. The heater power supply circuit 154 may include a digital-to-analog converter. A digital signal from the controller 160 can be converted into an analog signal for driving the heater 146*h*.

The reproduced waveform amplification circuit 156 amplifies a reproduction signal generated when the head 146 reads a magnetization state of the surface of the disk 110. The amplified reproduction signal is transmitted to the controller 160.

The heater resistance measurement circuit 158 is connected to the heater 146*h* and is controlled by the controller 160 when the electric resistance of the heater 146*h* is measured. By measuring the resistance of the heater 146*h*, a relationship between power supplied by the heater power supply circuit 154 and a value of the FH that varies when the heater 146*h* generates heat can be more accurately evaluated.

The controller 160 includes a hard disk controller (HDC) 162, a memory 164, a microprocessor unit (MPU) 166, and a channel 168.

The HDC 162 controls data transfer between the host 170 and the channel 168 in response to an instruction from the MPU 166. The HDC 162 is electrically connected to, for example, the memory 164, the MPU 166, the channel 168, and the like. Here, the channel 168 is a signal processing circuit of read/write data.

The memory 164 includes a volatile memory or a nonvolatile memory. For example, the memory 164 includes a buffer memory including a DRAM, and a flash memory. The memory 164 stores a program and parameters necessary for processing of the MPU 166.

The MPU 166 is a main control unit of the magnetic disk device 100, and executes servo control necessary for read/write control and positioning the head 146.

The MPU 166 is connected to the head amplifier 150 via the channel 168. In addition, the MPU 166 drives the spindle motor 120 via the driver IC 130 to control a rotational speed of the disk 110, and drives the actuator 142 of the head assembly 140 to position the head 146 on the disk 110. The control of the driver IC is not limited to the case of being performed by the MPU 166 internally installed in the magnetic disk device 100, and may be performed by, for example, an external CPU.

The MPU 166 includes a read/write controller 166*rw*, a heater controller 166*h*, a measurement controller 166*m*, and a calculator 166*c*.

The read/write controller 166*rw* controls read/write processing of data in response to a command from the host 170 or the like. Specifically, the actuator 142 is controlled via the driver IC 130, and the head 146 is positioned at a predetermined position on the disk 110 to read/write data.

The heater controller 166*h* is connected to the heater power supply circuit 154 of the head amplifier 150 via the channel 168. The heater controller 166*h* controls a value of electric power supplied to the heater 146*h*. The heater power supply circuit 154 supplies electric power to the heater 146*h* of the head 146. The heater controller 166*h* controls an operation of the heater 146*h* and controls the FH.

The measurement controller 166*m* is connected to the heater resistance measurement circuit 158, and measures an electric resistance value or the like of the heater 146*h*. The calculator 166*c* calculates a value of the electric power to be supplied to the heater 146*h* on the basis of the electric resistance value or the like measured by the measurement controller 166*m*. The measurement controller 166*m* may measure an error rate, a track width, or the like in addition to the electric resistance of the heater 146*h*.

Next, the operation of the magnetic disk device 100 will be described. At the time of reading/writing performed by the magnetic disk device 100, the controller 160 drives the spindle motor 120 to rotate the disk 110. The controller 160 also drives the actuator 142 of the head assembly 140 to position the head 146 at a predetermined position on the disk. A thin layer of air is created between the rotating disk 110 and the head 146 positioned above the disk 110, and an air bearing is formed.

When the air bearing is formed, the heater controller 166*h* adjusts the FH which is the interval between the disk 110 and the head 146 (a thickness of the layer of the air bearing). The heater controller 166*h* controls the electrical signal flowing to the heater 146*h* via the heater power supply circuit 154 of the head amplifier 150. At this time, the heater power supply circuit 154 transmits the electrical signal to the heater 146*h*, and the electrical signal may be, for example, current, voltage, or electric power. For example, the heater 146*h* is heated by increasing a magnitude of the electrical signal, for example, current, which is transmitted to the heater 146*h*, and adjustment is performed in a direction in which the FH decreases. On the other hand, for example, adjustment is performed in a direction in which the FH increases by decreasing the magnitude of the electrical signal, for example, the current, which is transmitted to the heater 146*h*.

In addition, the heater controller 166*h* can be controlled on the basis of the value of electric power determined by the measurement controller 166*m* and the calculator 166*c* from the measurement result of the heater resistance measurement circuit 158.

After the FH is adjusted, the read/write controller 166*rw* positions the head 146. The driver IC 130 drives the actuator 142 to control the arm 144, thereby disposing the head 146 on a predetermined track. The controller 160 controls an information writing operation via the current supply circuit 152 of the head amplifier 150, for example. Alternatively, a reading operation is performed via the reproduced waveform amplification circuit 156. When the disk 110 rotates, information is read or written from or to a predetermined track. Subsequently, the read/write controller 166*rw* positions the head 146, and then moves the head to a track to which a read/write operation of the head 146 is performed.

Figure 2:
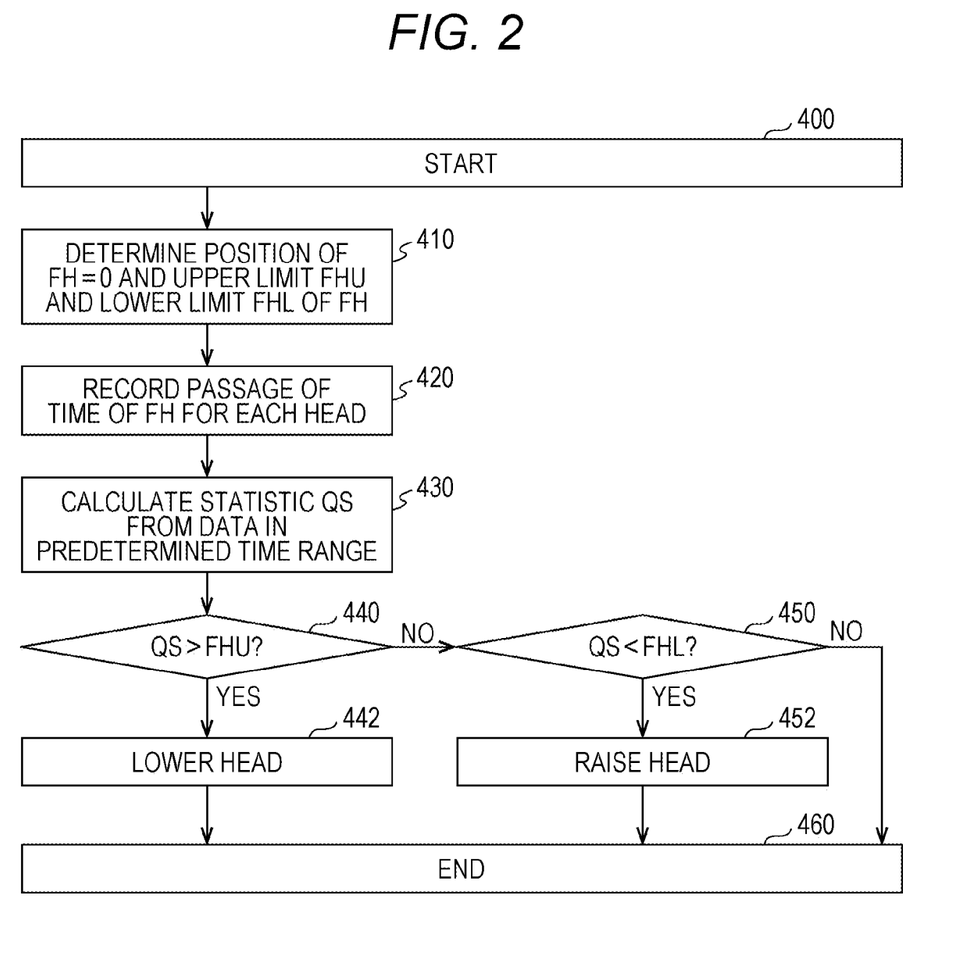
FIG. 2 is a flowchart illustrating a method for adjusting a head flying height in the magnetic disk device according to the first embodiment.

FIG. 2 is a flowchart illustrating a method 400 for adjusting a head flying height in the magnetic disk device according to the first embodiment. The partial or entire adjustment method 400 is adapted to the magnetic disk device 100 described with reference to FIG. 1.

First, as illustrated by block 410, a position which becomes a reference of a measurement value of the FH, that is, a position of FH=0, is defined. The position of FH=0 is determined as a desirable position for the stability of read/write performed by the head 146, for example, by conducting a test on the magnetic disk device 100 before shipment.

Further, a permissible flying upper limit value FHU (>0) and a permissible flying lower limit value FHL (<0) of FH are defined based on FH=0. The flying upper limit value FHU and the flying lower limit value FHL are examples of thresholds of the head flying height. The flying upper limit value FHU may be defined as a position at which it is difficult to read/write data from/to the disk 110 when the FH is increased, for example. In addition, the flying upper limit value FHU may be determined by subtracting a predetermined value (referred to as a margin) from the value of the FH at which it is difficult to read/write data. It is desirable to define the margin since the flying height can be adjusted with a margin before it becomes difficult to actually read/write data.

On the contrary, the flying lower limit value FHL can be determined from a value of an FH when the head 146 and the disk 110 are in contact with each other, for example, as the FH is decreased. In addition, the flying lower limit value FHL may be determined by adding a predetermined value (referred to as a margin) to the value of the FH when the head 146 and the disk 110 are in contact with each other. The margin for the flying lower limit value FHL may be different from the margin for the flying upper limit value FHU.

Next, as illustrated by block 420, a change in the value of the FH (chronological data) in a passage of time is recorded for each head 146. The magnetic disk device 100 includes, for example, a plurality of heads 146. During the operation of the magnetic disk device 100, for example, values of FHs are measured for the plurality of heads at regular time intervals. The regular time intervals may be, for example, every 1 hour or every 10 hours. The value of the FH may be measured for all the heads every ten hours, or for example, the value may be measured such that measurement is sequentially performed for one head per hour of ten heads and making one cycle in ten hours.

In addition, the FH can be measured, for example, by reading a servo track provided on the disk 110. A plurality of servo tracks are provided from an inner circumference to an outer circumference of the disk 110, for example, in the radial direction of the disk 110.

The measured value of the FH is recorded in, for example, the storage region 112 provided in the disk 110. The measured value of the FH is read/written by the head 146 and used for subsequent calculations. Note that at least some measured values of the FH may be recorded in the memory 164 illustrated in FIG. 1 without being recorded in the storage region 112, or may be recorded by an external memory provided outside the magnetic disk device 100.

Subsequently, as illustrated by block 430, predetermined statistic QS is calculated from the chronological data of the FH. The calculation of the statistic may be performed, for example, by the MPU 166 illustrated in FIG. 1 or may be performed by a CPU provided outside the magnetic disk device 100. The statistic QS is, for example, a standard deviation. The statistic QS may be obtained by multiplying the standard deviation by a constant. Here, the standard deviation is the square root of an average of the square of deviations (difference from a mean value) of values of FHs measured in a certain time range. The standard deviation indicates a degree of variations in a time change of the FH.

The statistic QS can be considered to be a generalized mean (where $p \geq 0$) obtained by the p-th root of an average of absolute values to the power of p of the deviations. For example, in the case of $p=1$, a mean absolute error is obtained. Note that an example will be described below in which a standard deviation corresponding to $p=2$ is considered in order to evaluate the variations in the chronological data of the FHs and estimate a distribution of the FHs.

As an example, by considering the standard deviation as the statistic QS, expansion of a distribution can be quantitatively evaluated by the standard deviation when a normal distribution is assumed as the distribution of the FHs. For example, in a case where an edge of the normal distribution includes the flying upper limit value FHU, it is possible to calculate a position of a value multiplied by the standard deviation at which the flying upper limit value FHU is reached, and stochastically estimate the possibility of exceeding the flying upper limit value due to the variations in FH. Specifically, in a case where the flying upper limit value FHU is included therein at a position of twice the standard deviation, the FH may exceed the flying upper limit value FHU with a probability of about 28. An adjustment timing of the FH can be determined while a comparison with a permissible defect rate is performed.

The variations in the chronological data (measured height FHm) of the FH includes both a variation in the FH itself due to impurities or the like included in the magnetic disk device and a measurement error related to the measurement of the flying height.

Alternatively, the statistic QS may be obtained by adding, to a mean of the FHs, a value obtained by multiplying the standard deviation by a constant. In addition, the statistic QS may be obtained by adding, to a mode or a median, a value obtained by multiplying the standard deviation by a constant. Note that the mode can be obtained from, for example, a histogram or the like in which a class width is determined on the basis of a range of data of the FH. The statistic QS may be values including at least one kind of generalized mean (for example, standard deviation).

As illustrated in block 440, the controller 160 determines whether the statistic QS is larger than the flying upper limit value FHU. First, in the case of QS>FHU, the head 146 is lowered in the next block 442 since the FH is too large. Here, the head 146 is lowered by causing the heater controller 166h to control the heater 146h via the heater power supply circuit 154.

On the other hand, in the case of QS≤FHU, whether the statistic QS is smaller than the flying lower limit value FHL is determined by the controller 160 as illustrated in block 450. First, in the case of QS<FHL, in order to reduce the possibility that the head 146 and the disk 110 are brought into contact with each other, the head 146 is raised in the following block 452. Note that the flying upper limit value FHU and the flying lower limit value FHL described in the example illustrated in FIG. 2 are determined to have a margin, and for example, the case of QS<FHL does not immediately mean contact.

The heads determined as FHL≤QS≤FHU in the blocks 440 and 450 and the heads subjected to the adjustment of the FH in the blocks 442 and 452 finally end adjustment of the FH in the block 460, and processing proceeds to the next operation as necessary. For example, the read/write operation is restarted.

Although the example of deriving the statistic QS for each head has been described in the blocks 420 and 430, for example, pairs of heads may be formed, and the statistic may be calculated for each pair, or the statistic may be calculated for each set of three heads. The flying height adjustment of the head illustrated in the blocks 442 and 452 may be performed for each set of two heads or for each set of three heads. In order to quickly detect a defective head, it is desirable to calculate the statistic for a smaller number of heads, and it is desirable to calculate the statistic QS for each head.

Figure 3:
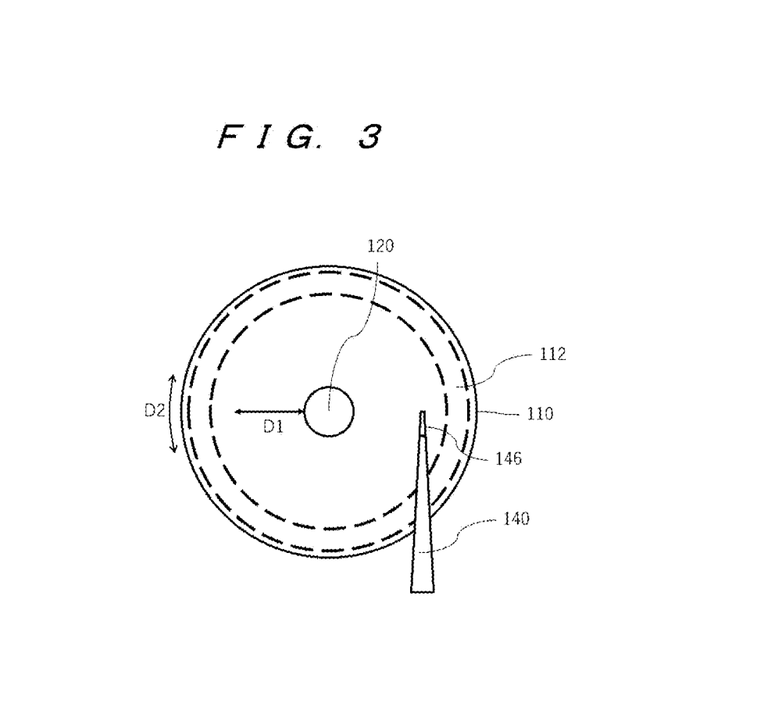
FIG. 3 is a plan view illustrating an example of arrangement of storage regions provided in a disk.

FIG. 3 is a plan view illustrating an example of arrangement of the storage regions 112 provided on the disk 110. First, the radial direction of the disk 110 is represented by D1, and a circumferential direction is represented by D2. The head assembly 140 and the head 146 provided in the head assembly 140 scan the disk 110 in the radial direction D1. The disk 110 is rotated in the circumferential direction D2 by the spindle motor 120.

The storage region 112 is positioned, for example, in a track on an outer circumference (outer circumferential track) of the disk 110. That is, the storage region is provided on the surface of the disk 110 to extend in the circumferential direction D2 at a position away from the spindle motor 120 in the radial direction D1.

Note that, although not illustrated in FIG. 3, a plurality of servo tracks for measuring the value of the FH are provided in the circumferential direction D2, for example, at intermittent positions in the radial direction D1. For example, a plurality of servo tracks are provided inward from the storage region 112 (outer circumferential track) in the radial direction D1.

Figure 4:
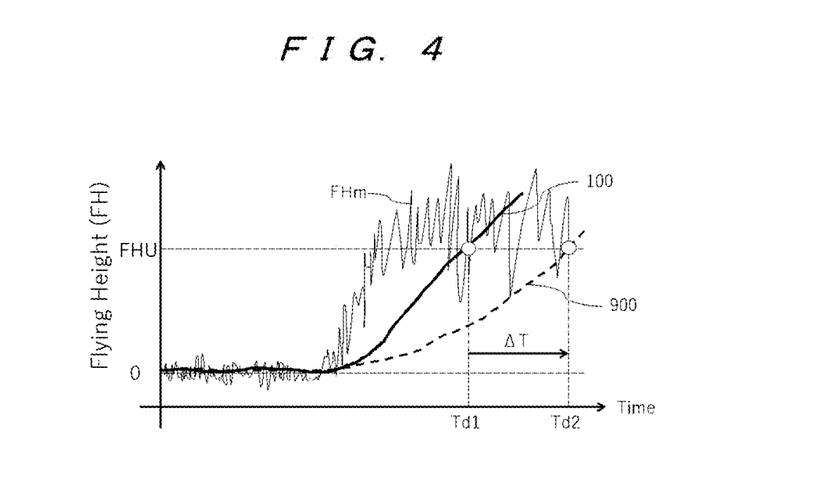
FIG. 4 is a graph illustrating a difference in response flying heights between the first to fluctuations of embodiment and a comparative example.

FIG. 4 is a graph illustrating a difference in response to fluctuations of the FHs between the magnetic disk device 100 according to the embodiment and a magnetic disk device 900 according to a comparative example. The horizontal axis in FIG. 4 represents time. The vertical axis represents the FH.

The measured height FHm represented by a solid line with large fluctuations denotes a measured height of a FH of a single head at a predetermined moment. Alternatively, the measured height FHm may denote a movement mean in a predetermined time span instead of a value of an instantaneous FH. In addition, a magnitude of a variation in the measured height FHm depends on both a magnitude of a variation in the movement itself of the single head and an error related to the measurement of the FH.

Next, the other solid line represents a passage of time of the statistic QS in the magnetic disk device 100 according to the embodiment. The statistic QS is a physical quantity having a dimension of a length, similarly to the FH. The statistic QS is, for example, $3\sigma$ ($\sigma$ is a standard deviation for an FH of a single head). In the embodiment, the flying height of the head 146 is adjusted on the basis of the adjustment method 400 by comparing the statistic QS with the flying upper limit value FHU of the FH.

In the embodiment, a statistic QS for evaluating a data variation such as a standard deviation for chronological data of the FH is considered. An effect of the variation denoted by the measured height FHm is reduced by evaluating the variation of the data instead of the value of the data itself. A time point Td1 represents a time point at which the statistic QS exceeds the flying upper limit value FHU of the FH in the magnetic disk device 100 according to the embodiment.

Lastly, a dotted line represents a temporal change in the FH in the magnetic disk device 900 according to the comparative example. The magnetic disk device 900 according to the comparative example includes a plurality of disks and a plurality of heads, and the dotted line illustrated in FIG. 4 represents a temporal change of a value obtained by averaging FHs of all the heads at a certain time point.

That is, the dotted line illustrated in FIG. 4 represents a mean obtained by including chronological data of a FH of another head having a small fluctuation in the FH in addition to the measured height FHm represented by the solid line, and the fluctuation in the FH may be gentler than the measured height FHm represented by the solid line. In the magnetic disk device 900 according to the comparative example, the variation denoted by the measured height FHm represented by the solid line is reduced by taking a mean for all the heads. However, the fluctuation of the FH is gentle, and a time point Td2 at which the dotted line extends beyond the FHU is later than Td1.

A position at the time point Td2 measured with the time point Td1 as a reference is referred to as a detection time difference $\Delta T$. That is, $\Delta T>0$ when the time point Td1 is earlier than the time point Td2. When the time point Td1 is later than the time point Td2, $\Delta T<0$. This indicates that the larger the detection time difference $\Delta T$ in a positive direction, the more quickly the magnetic disk device 100 according to the embodiment detects abnormality of the fluctuation of the FH of the measured height FHm represented by the solid line and adjusts the flying height than the magnetic disk device 900 according to the comparative example.

Figure 5:
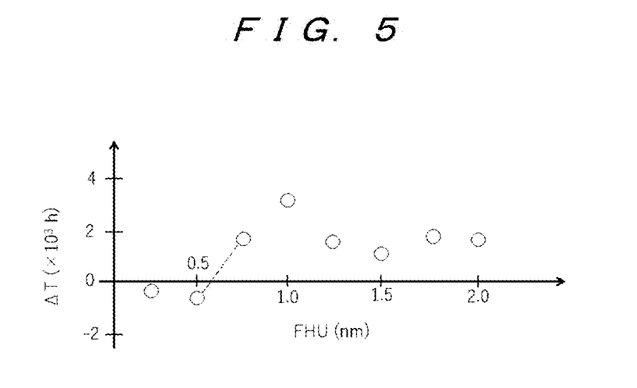
FIG. 5 is a graph illustrating a relationship between a flying upper limit value and a detection time difference between the first embodiment and the comparative example.

FIG. 5 is a graph illustrating a relationship between the flying upper limit value FHU and the detection time difference $\Delta T$ between the magnetic disk device 100 according to the first embodiment and the magnetic disk device 900 according to the comparative example with respect to a waveform of the measured height FHm represented by the solid line illustrated in FIG. 4. The horizontal axis represents the flying upper limit value FHU. Here, the flying upper limit value FHU is variable depending on the configuration and required performance of the magnetic disk device 100, and can take various values since any margin can be considered. The vertical axis represents the detection time difference $\Delta T$.

In addition, the magnetic disk device 100 according to the embodiment indicates a case where the statistic QS=$3\sigma$ as an example.

As illustrated in FIG. 5, $\Delta T<0$ when FHU=0.5 nm or smaller, and $\Delta T>0$ when FHU=0.75 nm or larger. By performing interpolation between a point at FHU=0.5 nm and a point at FHU=0.75 nm, it can be read that $\Delta T>0$ in FHU$\geq$0.6 nm. In other words, in the case of the statistic QS=$3\sigma$, the magnetic disk device 100 according to the embodiment is more advantageous in FHU$\geq$0.6 nm than the comparative example.

In addition, the FHU is, for example, 4.0 nm or smaller. In addition, the FHU may be 3.0 nm or smaller.

For example, 0.6 nm$\leq$FHU$\leq$4.0 nm may be suitable. In addition, 0.6 nm$\leq$FHU$\leq$3.0 nm may be suitable. In addition, 0.6 nm$\leq$FHU$\leq$2.0 nm may be suitable. In addition, 0.75 nm$\leq$FHU$\leq$2.0 nm may be suitable.

According to the method for adjusting a flying height of the head in the magnetic disk device 100 according to the embodiment, it is possible to reduce the effect of the variation in the flying height and quickly adjust the flying height by calculating the statistic QS from the chronological data of the FH and adjusting the head flying height. Here, the variation includes a variation due to vibration of the head 146 on the disk 110 and a variation due to a measurement error when the value of the FH is measured. In addition, rapid adjustment of the flying height means raising or lowering the flying height of the head at a timing earlier than the fluctuation of the flying height.

The effect of the variation can be reduced by using the statistic QS as an adjustment index. The statistic QS is obtained by multiplying the standard deviation for the chronological data of the FH by a constant, for example. In general, the standard deviation increases as the variation in the measured height FHm in FIG. 6 increases. That is, according to the embodiment, the larger the variation, the faster the detection time, and the sooner the head flying height can be adjusted.

The magnitude itself of the variation in the measured height FHm can be evaluated by using the statistic QS for evaluating the variation of data for a single head or a small number of heads such as two or three. Adjustment of flying heights of a small number of heads enables a defective head to be quickly found and the flying height to be adjusted.

Further, for example, in a case where the measured height FHm itself is smaller than the flying upper limit value FHU, but the variation in the measured height FHm is large, there is a possibility that the FH may significantly fluctuate to the next measurement time point. Hence, adjustment of the flying height in advance enables the service life of the magnetic disk device to be extended.

For comparison, in a case where the head flying height is adjusted on the basis of the measured height FHm illustrated in FIG. 4, there is an effect of the variation in the measured height FHm. For example, at a moment when the variation is large in a positive direction, the head flying height may be adjusted at a very early timing. Conversely, at a moment when the variation is large in a negative direction, the adjustment of the head flying height may be delayed and may not be performed in time.

In addition, in a case where the mean is used as the adjustment index as in the adjustment method according to the comparative example 900, the mean changes due to a comprehensive change in the measured height FHm (for example, a gradual increase in the measured height FHm in FIG. 4). However, in a case where the variations in the measured height FHm offset each other in the positive direction and the negative direction, it is not possible to estimate the magnitude of the variation from the mean. That is, in a case where the mean is used as an index, the magnitude of the variation in the measured height cannot be evaluated. For example, in a case where the mean falls within a permissible range but the variation in the measured height is actually equal to or larger than the flying upper limit value FHU, the flying height cannot be adjusted in advance.

According to the embodiment, for example, the standard deviation is employed as the statistic QS for enabling the magnitude of the variation in the measured height FHm to be evaluated, and the head flying height is adjusted in consideration of both the comprehensive change in the measured height FHm and the magnitude of the variation, in a case where the measured height FHm significantly varies in both the positive and negative directions, the flying height can be quickly adjusted. By using the generalized mean, it is possible to quickly detect variations in both the positive and negative directions by considering the absolute value of the deviation.

As the variation in the measured height FHm increases in both the positive and negative directions, the flying height is adjusted more quickly, so that it is possible to prevent the flying height from exceeding the flying upper limit value FHU (or being smaller than the flying lower limit value FHL). The larger the variation in the measured height FHm, the higher the possibility that the FH will fluctuate rapidly later. Even if the mean is significantly different from the flying upper limit value FHU and the flying lower limit value FHL, the adjustment of the flying height in advance enables the service life of the magnetic disk device to be extended.

Further, the statistic QS can be calculated not only for a single head but also for two heads or three heads collectively. For example, a mean may be calculated for each of the two heads and stored as chronological data of the FH. A capacity of the data can be reduced to ½ as compared with the case where chronological data of the single head is stored. By evaluating, as the statistic QS, the variation in the chronological data of the FH, the statistic can be used as an index of adjustment of the flying height for a smaller number of heads, and a defective head can be found without being mixed in normal heads. As compared with the comparative example 900 in which the mean of all the heads is calculated, a defective head can be detected earlier.

In the embodiment, the flying height can be adjusted more quickly than in the comparative example 900 in which the mean of all the heads is obtained. As illustrated in FIG. 5, when QS=3σ, the head flying height can be adjusted earlier when 0.6≤FHU≤2.0 nm than in the comparative example 900.

In the comparative example 900, since the mean of all the heads is calculated and the head flying height is adjusted for all the heads without exception, adjustment may be performed even on a head having a head flying height which does not need to be adjusted. Hence, in a case where the mean of all the heads exceeds the flying upper limit value FHU, but there is a possibility that a certain head may be in contact with the disk, there is a possibility that the head and the disk may be caused to be in contact with each other by controlling the heads to be lowered, and the service life of the magnetic disk device may be shortened.

On the other hand, in the embodiment, by adjusting the flying height for each head, a head lowering instruction is issued only for a head with FH>0, and a head raising instruction is issued only for a head with FH<0. Even in a case where a small number of heads with FH<0 are present among a large number of heads with FH>0, it is possible to extend the service life of the magnetic disk device by optimally instructing individual heads to be raised or lowered. In addition, not only in the case where the flying height is adjusted for each head, but also in the case where the flying heights of two heads or three heads are collectively adjusted, it is possible to instruct a head to be raised or lowered while curbing the contact between the head and the disk as compared with the comparative example 900.

Figure 6:
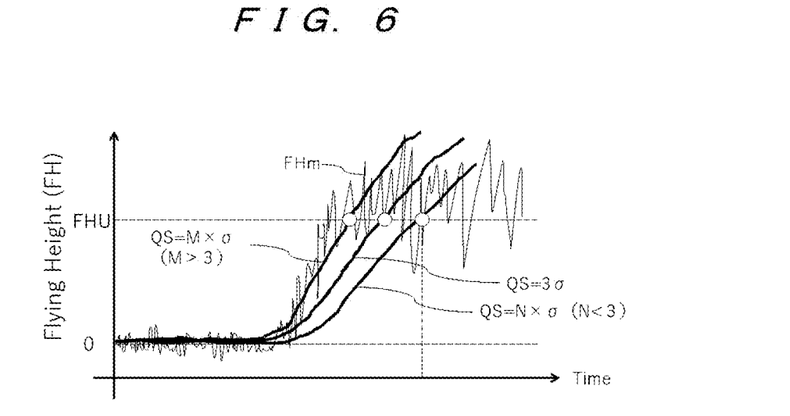
FIG. 6 is a graph for comparing values of various statistics in the method for adjusting a head flying height in the magnetic disk device according to the first embodiment.

In addition, a change in the adjustment timing of the FH when the statistic QS is variously changed will be described with reference to FIG. 6. As the statistic QS, a value obtained by multiplying a standard deviation σ by a constant is considered as an example. Note that, in consideration of the standard deviation, for example, in a case where a distribution of the FH is assumed to be a normal distribution, or the like, it is possible to perform quantitative comparison with a defect rate, and the adjustment timing of the FH can be determined according to the performance required for the magnetic disk device.

First, the case of QS=M×σ (M>3) will be described with the case of QS=3σ as a reference. For example, M=4 or M=5 may be set. Since σ>0, a time taken to reach the flying upper limit value FHU is shorter in the case of QS=M×σ (M>3) than in the case of QS=3σ.

On the other hand, in the case of QS=N×σ (N<3), a time taken to reach the flying upper limit value FHU is longer than in the case of QS=3σ. Here, N=2 or N=1 may be set.

That is, in a case where a value obtained by multiplying the standard deviation σ by a constant is considered as QS, it is possible to optimize a timing (detection time) of adjusting the flying height by making the constant multiplied by the standard deviation σ variable. Note that a plurality of constants which are multiplied by the standard deviation σ are considered as the statistic QS such that when any one of the statistics exceeds the flying upper limit value FHU, the flying height may be adjusted. In other words, according to the embodiment, since the optimum statistic QS can be determined from the various statistics QS, the detection time can be further shortened as compared with the comparative example 900.

Second Embodiment

Figure 7:
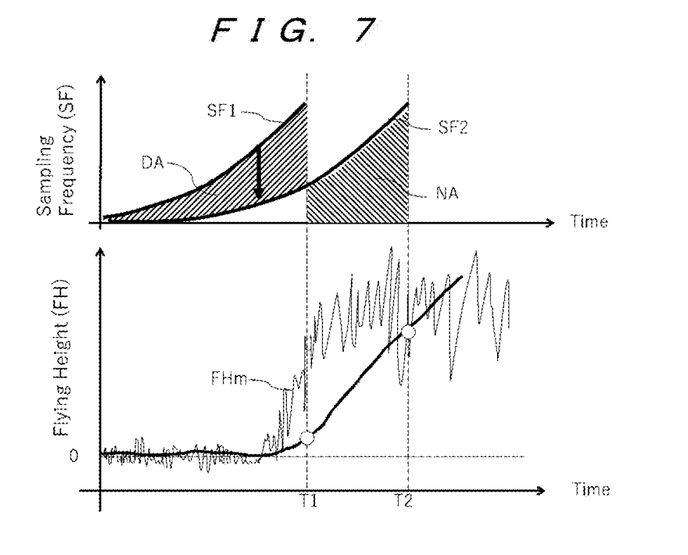
FIG. 7 is a graph illustrating an example of control of a sampling frequency (SF) in a method for adjusting a head flying height in a magnetic disk device according to a second embodiment.

FIG. 7 illustrates an example of a method of determining a sampling frequency (SF) in a method for adjusting a head flying height according to a second embodiment. The description of common portions with the first embodiment will be omitted, and different portion therefrom will be described.

First, the definition of the sampling frequency (SF) will be described. The SF refers to the number of samplings per unit time. For example, when SF=0.5 $h^{-1}$, this means that the FH is measured (the measured height FHm is sampled) every two hours, and the chronological data of the FH is accumulated every one hour. Note that, in a case where the accumulated chronological data is thinned out, it is assumed that the SF is reduced afterwards. For example, it is possible to change SF=1 $h^{-1}$ to SF=0.5 $h^{-1}$ by measuring the FH every one hour and erasing even-numbered (or odd-numbered) data later from the accumulated chronological data of the FH every one hour.

Note that there is no need to necessarily erase data, and the sampling frequency (SF) may be substantially changed by changing a time interval of the chronological data used to calculate the statistic QS. That is, only some of the chronological data may be used to calculate the statistic QS. Hereinafter, the case of discarding data includes both the case of erasing data and the case where some of the recorded data is not used for the calculation of the statistic QS.

This means that the larger the SF, the more frequently the FH is measured and data is accumulated. The SF can be changed depending on a time point. For example, the SF may be made larger as a time point approaches a current time point. This is because the time point closer to the current time point is more important in order to predict the fluctuation of the FH until the next measurement time point. In addition, the SF is not limited to the case of smoothly changing as in the example illustrated in FIG. 7, and may change stepwise.

FIG. 7 illustrates a time distribution of the SF at a time point T1 and a time point T2 later than the time point T1. The time distribution of the SF represents a time change of the SF (including a case of adjusting the SF by erasing data afterwards) that changes depending on a time point. An SF at the time point T1 corresponds to SF1, and an SF at the time point T2 corresponds to SF2.

A time distribution of an SF is a distribution in which the SF becomes high as a time point approaches the current time point. The later the data is recorded, the higher SF a distribution has. In addition, as can be found by comparing a value of SF1 at the time point T1 and a value of SF2 at the time point T1, even at the same time point (for example, T1), the SF may change by erasing data afterwards as time passes. An SF at a predetermined time point decreases as time passes.

A change in the SF from the time point T1 to the time point T2 will be described. From the time point T1 to the time point T2, data to be newly stored (represented by a new region NA in FIG. 7) is generated since the chronological data in a time span after the time point T1 and before the time point T2 is sampled.

On the other hand, the chronological data accumulated according to the sampling frequency SF1 at the time point T1 is discarded by the amount in a discarding region DA which is a region corresponding to a difference from the sampling frequency SF2 at the time point T2. In other words, it is necessary to newly record the data corresponding to the new region NA from the time point T1 to the time point T2, and at the same time, the data corresponding to the discarding region DA can be discarded. For example, an increase rate or the like of the SF is determined so that data amounts of the new region NA and the discarding region DA become equal, and thereby it is possible to update the chronological data while a certain amount of data is recorded in the limited storage region 112 of the disk 110.

According to the method for adjusting a head flying height of the embodiment, it is possible to reduce the data amount by arranging the chronological data such that the SF becomes lower as the time goes back to the past. Alternatively, it is possible to increase the SF at a time point close to the current time point, measure the fluctuation of the current FH with higher accuracy, and predict the fluctuation of the FH to the next measurement time point.

The chronological data of the FH can be stored in the disk 110, for example, as illustrated in FIG. 3. Since the storage region of the disk 110 is compressed as the chronological data of the FH increases, the substantial storage capacity of the disk 110 can be increased by reducing the data amount of the chronological data of the FH.

It is not desirable to store the measured heights of all the FHs in the past since the storage capacity of the disk 110 is consumed. Hence, the storage region of the disk 110 is released by discarding at least some of the data in the past. Here, in general, a correlation with the measured height at the current time point decreases as the time goes back from the current time point, and thus, it is possible to increase a ratio of discarding data as the time goes back to the past. Alternatively, it is conceivable that data after a certain period of time is discarded without exception.

Whether or not the FH significantly fluctuates until a measurement time point of the next FH can be accurately predicted by the chronological data of the FH measured particularly at a time point close to the current time point. Hence, by using more chronological data of the FH measured at a time point close to the current time point, the timing of adjusting the flying height can be a timing at which a future flying fluctuation can be accurately predicted.

Further, by equalizing the data amounts in the new region NA and the discarding region DA, for example, the data amount recorded in the storage region 112 of the disk 110 can be maintained constant. Hence, even in a case where an operation time of the magnetic disk device becomes long, it is possible to store the chronological data in the storage region 112.

Third Embodiment

Figure 8:
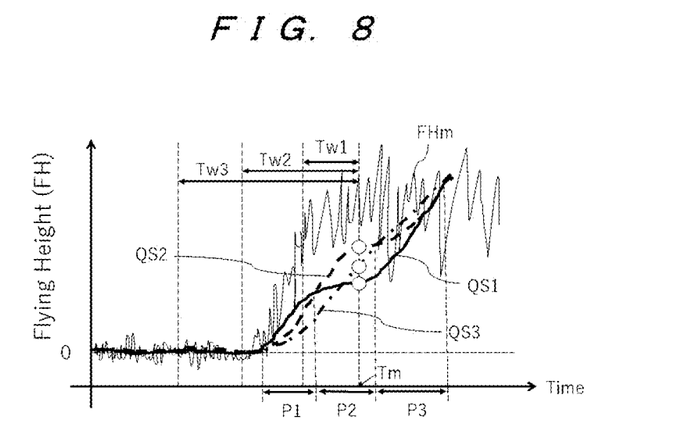
FIG. 8 is a graph illustrating an example of calculating a statistic for a plurality of time spans in a method for adjusting a head flying height in a magnetic disk device according to a third embodiment.

FIG. 8 illustrates an example of a method of calculating a plurality of statistics QS1, QS2, and QS3 in a method for adjusting a head flying height according to a third embodiment.

The statistics QS1, QS2, and QS3 are obtained by multiplying, for example, the standard deviation by respective constants (the constants are common, for example 3). The statistics QS1, QS2, and QS3 have different respective ranges used for calculation of the chronological data of the FH. For example, at a time point Tm, QS2>QS3>QS1.

The statistic QS1 is calculated on the basis of a time range traced back by a first time span Tw1 with the measurement time point Tm as a reference. The statistic QS2 is calculated on the basis of a time range traced back by a second time span Tw2 with the measurement time point Tm as a reference. The statistic QS3 is calculated on the basis of a time range traced back by a third time span Tw3 with the measurement time point Tm as a reference. Tw1<Tw2<Tw3.

Since items of the data used to calculate the statistics are different, the statistics QS1, QS2, and QS3 are generally different. For example, in a passage of time, there are a period P1 in which QS1 is the largest, a period P2 in which QS2 is the largest, and a period P3 in which QS3 is the largest. An example of behavior of QS1, QS2, and QS3 will be described below.

First, at a time point before the period P1, the FH is stable around FH=0, and all of QS1, QS2, and QS3 show the same level of statistics.

The period P1 is a period in which the FH starts to increase comprehensively (ignoring fine fluctuations due to variations). Since the statistic QS1 is an amount for the shortest time span, a ratio of a period in which the FH increases to a time span used for the calculation of the statistic QS1 is higher than that in the cases of QS2 or QS3, and the variation in the measured height FHm becomes large. Since QS2 and QS3 are calculated using an extended period in which the FH before the period P1 is stable than QS1, the variation in the FHm becomes small.

Next, the period P2 is a period in which the comprehensive increase of the FH becomes gentle. The time point Tm is included in the period P2. In the period P2, QS2 corresponding to the time span Tw2 detects the fluctuation from the start of the increase in the FH, and the variation of the FHm is evaluated to be large. Since QS1 is calculated in a period in which the increase in FH becomes gentle, QS1 becomes smaller than QS2. QS3 is reduced in consideration of the data of the FHm before the period P1.

Subsequently, the period P3 is a period in which the comprehensive increase in the FH ends and the effect of the variation increases. QS3 is used to detect the fluctuation from the start of the increase in the FH in the longest time span Tw3, and the variation in the FHm is evaluated to be large.

When the time further passes, all of QS1, QS2, and QS3 are calculated from the chronological data of the FH after the comprehensive increase is completed, and thus, the statistics have the same magnitude.

The plurality of statistics described above are calculated at respective time points, and the flying height is adjusted depending on whether the largest statistic exceeds the flying upper limit value FHU or the flying lower limit value FHL. Since the flying height is adjusted on the basis of the statistic QS1 in the period P1, the flying height can be quickly adjusted in a period of a large increase in the FH. Similarly, the flying height is adjusted on the basis of the statistic QS2 in the subsequent period P2, and the flying height is adjusted on the basis of the statistic QS3 in the period P3.

Note that QS1, QS2, and QS3 are, for example, obtained by multiplying the deviation by respective constants (the constants are common). Further, a plurality of statistics may be calculated by changing the constant. Both the time span and the constant can be changed to calculate a plurality of statistics, and the flying height can be adjusted on the basis of the largest statistic at each time point.

According to the method for adjusting a head flying height according to the embodiment, by calculating a plurality of statistics for a plurality of time spans (Tw1, Tw2, Tw3, and the like) and adjusting the flying height, it is possible to select an optimal time span for each step of the increase in the FH to quickly adjust the flying height.

Each step of the increase in the FH refers to a series of flows in which the FH starts to comprehensively increase (the period P1), the comprehensive increase in the FH becomes gentle (the period P2), and the comprehensive increase of the FH ends (the period P3). In order to quickly adjust the flying height by reflecting the fluctuation in the flying height in the statistic, a desirable time span may change for each period.

By calculating the plurality of statistics and adjusting the flying height using, as an index, the statistic that is maximized at each time point, it is possible to quickly adjust the flying height.

In addition, in a case where it is not clear in what time scale the fluctuation of the flying height occurs (for example, whether the flying height fluctuates rapidly in one hour, fluctuates in ten hours, or fluctuates over 100 hours or more), it is possible to quickly track the fluctuation of the flying height even with respect to the fluctuation occurring in any time scale by preparing various time spans.

In other words, by calculating the statistic in various time spans, it is possible to cope with flying fluctuations occurring in various time scales. The statistic may be calculated for not only three time spans Tw1, Tw2, and Tw3 but also four or more time spans. In addition, Tw1, Tw2, . . . may be determined to increase linearly, or may be determined to increase exponentially, for example.

Further, since the optimum time span can be more efficiently determined in the next measurement by using the calculation result of the obtained statistic, the flying height can be adjusted more quickly. Specifically, among a plurality of statistics calculated in a plurality of time spans for a measurement result at a certain time point, the largest statistic QSn and a corresponding time span Twn are known. Next, at the time point (once in 1 h, after 1 h in the case of statistic calculation) when the statistic is calculated, the time span is densely set in the vicinity of Twn among a plurality of set time spans (Tw1, Tw2, . . . ), so that a time span matching a timescale of the flying fluctuation more appropriately can be employed.

The plurality of set time spans (Tw1, Tw2, . . . ) do not necessarily have equal intervals, and a magnitude of a time interval for setting the time span can be adjusted by the calculation result of the statistic.

According to a semiconductor device of at least one of the first to third embodiments described above, for example, a value obtained by multiplying the standard deviation by a constant is calculated as the statistic QS from the chronological data obtained by measuring the head flying height FH, and the magnitude of the variation in the measured height FHm is evaluated. The fluctuation of the flying height can be evaluated for a single head, and the flying height can be quickly adjusted. As the variation in the measured height FHm is larger in both the positive and negative directions, the flying height is adjusted more quickly, so that the service life of the magnetic disk device can be extended.

The embodiments have been described above with reference to specific examples. However, the embodiments are not limited to these specific examples. In other words, modification examples obtained by appropriately modifying design of these specific examples by those skilled in the art are also included in the scope of the embodiments as long as the modification examples have the characteristics of the embodiments. The individual elements included in the specific examples described above, arrangement, materials, conditions, shapes, sizes, and the like thereof are not limited to those exemplified, and can be appropriately modified.

In addition, the individual elements included in the embodiments described above can be combined to the extent that combination can be technically performed, and a combination thereof is also included in the scope of the embodiments as long as the combination includes the characteristics of the embodiments. In addition, within the scope of the ideas of the embodiment, those skilled in the art can conceive various modifications and alterations, and it is understood that the modifications and the alterations also belong to the scope of the embodiments.

Although some embodiments of the present invention have been described, these embodiments have been presented as examples, and are not intended to limit the scope of the invention. These novel embodiments can be implemented in various other forms, and various omissions, substitutions, and changes can be made without departing from the gist of the invention. These embodiments and modifications thereof are included in the scope and gist of the invention, and are included in the scope of the invention described in the claims and equivalents or the like thereof.

What is claimed is:

1. A method for adjusting a head flying height in a magnetic disk device including a disk, heads that write or read data to or from tracks of the disk, and a heater provided near each of the heads, the method comprising:
   determining a threshold of the head flying height;
   calculating a statistic from chronological data of the head flying height; and
   adjusting the head flying height if the statistic exceeds the threshold, wherein the statistic includes at least one kind of generalized mean of absolute value of deviations in the chronological data of the head flying height.

2. The method for adjusting a head flying height according to claim 1, wherein the head flying height is adjusted by controlling an electrical signal flowing to the heater.

3. The method for adjusting a head flying height according to claim 1, wherein the head flying height is an interval between the disk and each of the heads measured by reading a servo track provided in the tracks.

4. The method for adjusting a head flying height according to claim 1, wherein a plurality of the statistics are calculated for each item of data included in time spans having a plurality of lengths, of the chronological data, and the head flying height is adjusted when at least one of the statistics exceeds the threshold.

5. A method for adjusting a head flying height in a magnetic disk device including a disk, heads that write or read data to or from tracks of the disk, and a heater provided near each of the heads, the method comprising:
   determining a threshold of the head flying height;
   calculating a statistic from chronological data of the head flying height; and
   adjusting the head flying height if the statistic exceeds the threshold, wherein the threshold includes a flying upper limit value that is a value obtained by subtracting a margin of 0 nm or larger from an upper limit value of the head flying height at which the head is able to write or read data.

6. The method for adjusting a head flying height according to claim 1, wherein the statistic is calculated for each of the heads.

7. The method for adjusting a head flying height according to claim 5, wherein the chronological data of the head flying height is recorded on an outer circumferential track of the tracks of the disk.

8. The method for adjusting a head flying height according to claim 7, wherein a servo track is provided inward from the outer circumferential track of the disk.

9. The method for adjusting a head flying height according to claim 1, wherein the statistic is obtained by multiplying a standard deviation of the chronological data of the head flying height by a constant.

10. The method for adjusting a head flying height according to claim 1, wherein
    the statistic is three times a standard deviation of the chronological data of the head flying height, and
    the threshold is 0.6 nm or larger and 2.0 nm or smaller.

11. The method for adjusting a head flying height according to claim 5, wherein the later the data is recorded, the higher a sampling frequency at which the chronological data of the head flying height is obtained becomes.

12. The method for adjusting a head flying height according to claim 11, wherein at least some of the chronological data recorded at a first sampling frequency at a first time point is discarded at a second time point after the first time point.

13. The method for adjusting a head flying height according to claim 5, wherein the head flying height is an interval between the disk and each of the heads measured by reading a servo track provided in the tracks, the chronological data of the head flying height is recorded on an outer circumferential track of the tracks of the disk, and the servo track is provided inward from the outer circumferential track of the disk.

14. The method for adjusting a head flying height according to claim 5, wherein a plurality of the statistics are calculated for each item of data included in time spans having a plurality of lengths, of the chronological data, and the head flying height is adjusted when at least one of the statistics exceeds the threshold.

15. A magnetic disk device comprising:
    a disk;
    heads that write or read data to or from tracks of the disk;
    a heater provided near each of the heads;
    a head amplifier connected to the heads and the heater, exchanging signals with the heads and supplying power to the heater; and
    a controller connected to the head amplifier that measures a head flying height, determines a threshold of the head flying height, and calculates a statistic from chronological data of the head flying height,
    wherein the head amplifier adjusts the head flying height if the statistic exceeds the threshold, and wherein the threshold includes a flying upper limit value that is a value obtained by subtracting a margin of 0 nm or larger from an upper limit value of the head flying height at which the head is able to write or read data.

16. The magnetic disk device according to claim 15, wherein the head amplifier adjusts the head flying height by controlling an electrical signal flowing to the heater.

17. The magnetic disk device according to claim 15, wherein the statistic is calculated by the controller for each of the heads.

18. The magnetic disk device according to claim 16, wherein the statistic is values including at least one kind of generalized mean of absolute value of deviations in the chronological data of the head flying height.

19. The magnetic disk device according to claim 18, wherein the statistic is obtained by multiplying a standard deviation of the chronological data of the head flying height by a constant.

20. The magnetic disk device according to claim 15, wherein the chronological data is recorded in the disk.

\* \* \* \* \*